June 27, 1967  P. J. WEAVER  3,327,591
HAND-LED CONTROL FOR POSITIONING ELEMENTS
Filed June 15, 1965
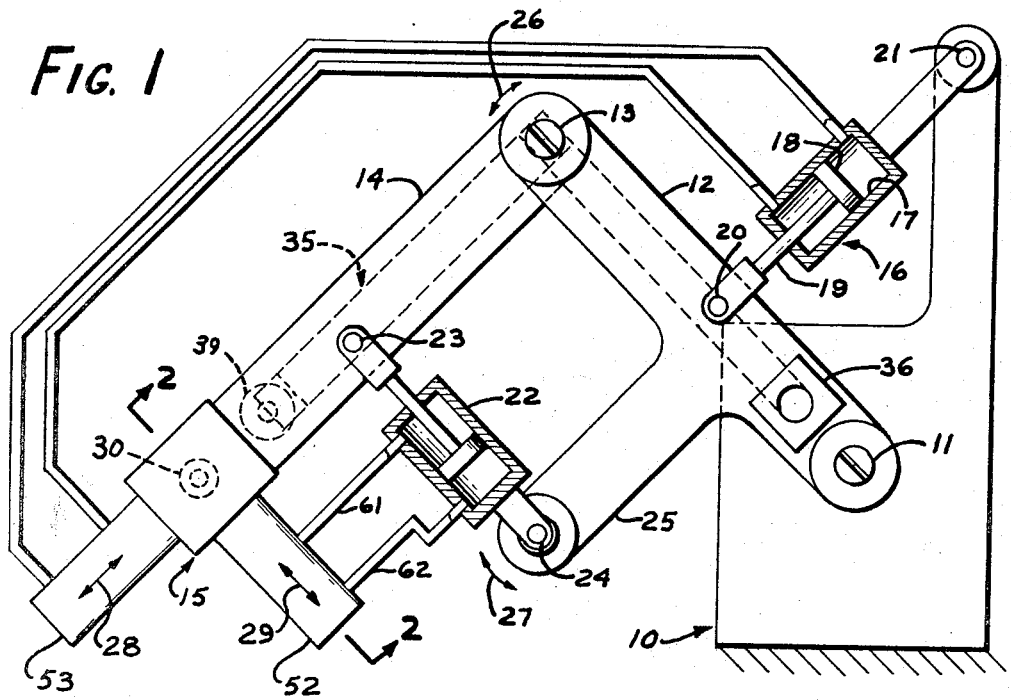
Fig. 1
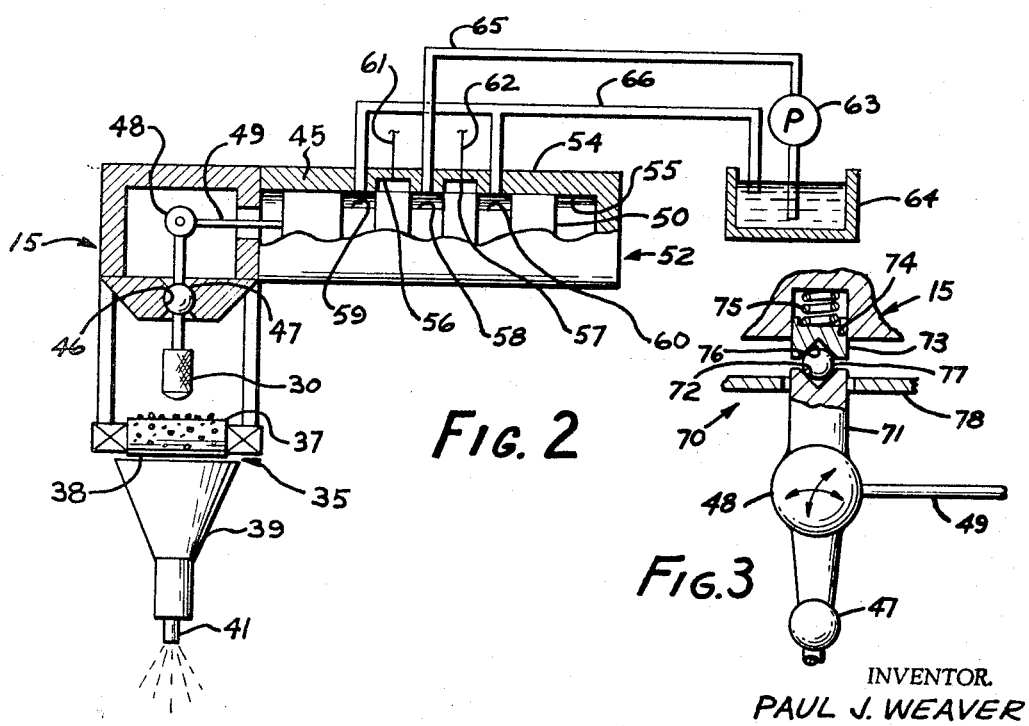
Fig. 2
Fig. 3
INVENTOR.
PAUL J. WEAVER
BY
ATTORNEYS.

United States Patent Office 3,327,591
Patented June 27, 1967

3,327,591
HAND-LED CONTROL FOR POSITIONING ELEMENTS
Paul J. Weaver, Pasadena, Calif., assignor to True-Trace Corporation, El Monte, Calif., a corporation of Connecticut
Filed June 15, 1965, Ser. No. 464,026
10 Claims. (Cl. 91—378)

This invention relates to a positioning control whereby an operator may directly control the position of a body by, himself, moving as a free body in space and leading the body along with him.

In various industrial controls it is common for an operator to govern the position of a device such as the operating end of a shovel, blade, scoop, or other like object by remaining in a fixed position such as in a seat and then manipulating a series of levers or other controls to govern the position and motion of the body under control. The difficulty with such a control is that it requires a mental association and correlation between the operator and the body under control, and by the time this is achieved, often the body has moved too far, or the process is out of control. At the very least, it requires an element of skill which ought to be minimized.

Another example is encountered in foundaries where sand is slung into molds in successive layers as a necessary preliminary step to a casting process. Heretofore, either the dispensing end of the sandslinger has been moved around bodily by the operator, or he has been seated at some distance from it and governed its positioning by remote control. The first process is very tiring, and the latter one has produced many rejects because of the lag time in mentally associating what is going on with the corrective positioning required. It is an object of this invention to provide a control which enables the operator to be associatively linked with the body being controlled and to enable them both easily to move through space as free bodies in association with each other requiring no mental connective link.

This invention is accomplished by providing a first and a second arm, the first arm being pivoted to a fixed pivot joint and the second arm being rotatably mounted to the first arm at a location spaced from the fixed pivot joint. A pair of motors is provided, one of which pivots the first arm around its fixed pivot relative to a reference structure, and the second of which pivots the second arm around its joint with the first arm. The planes of motion of the two arms are parallel.

The arms have a position where they are substantially normal to each other, and at a location on the second arm spaced from its joint with the first arm there is disposed a two axis mechanically operated servo valve (sometimes herein called a "tractor valve") whose axes are generally parallel to a respective one of said arms when the arms are in this position. This tracer valve incorporates a mechanical spindle (sometimes herein called a "handle" or a "stylus") which is universally tiltable so as to cause corrective motion within the tracer valve in all directions in the planes in which the arms move, which control directions are effective upon the motors. The motors have as their effect compliance with the commands of the tracer valve.

The above and other features of this invention will be fully understood from the following detailed description and the accompanying drawings in which:

FIG. 1 is a plan view of the presently preferred embodiment of the invention;

FIG. 2 is a cross-section taken at line 2—2 of FIG. 1; and

FIG. 3 is a cross-section showing an optional portion of the invention.

FIG. 1 shows the presently preferred embodiment of the invention wherein a reference structure 10 such as a foundation or a vehicle has mounted to it a vertical pivot 11 around which a first arm 12 is pivotable. A second pivot 13 is formed on the first arm, spaced from first pivot 11. To the second pivot there is mounted a second arm 14. Spaced from the second pivot and located at the end of arm 14 there is a two axis tracer valve 15.

A first motor 16 is of the reversible type and preferably is of the extensible type. However, whatever type of motor is used, it will be effective in turning the first arm around pivot 11. The simplest and most effective class of motor for this application is shown in FIG. 1 which includes a cylinder 17, a piston 18, and a rod 19. The rod is attached to the piston and to the first arm and the cylinder is mounted to the fixed structure. Bearings 20, 21 mount the rod and the cylinder respectively.

A second motor 22 is of the same class as that of the first motor. Its rod is mounted by bearing 23 to the second arm, and its cylinder is mounted by bearing 24 to an extension 25 of the first arm.

It will now be seen that the true motions of the first and second arm are through arcs 26, 27, respectively. However, when the arms are fairly long and normal to each other, the arcs are fairly small, and these arcs are reasonably coincident with axes 28, 29, respectively, of the tracer valve. Therefore, motions of the tracer valve will essentially be converted to motion of the arm, and this in a very simple system.

The tracer valve includes a stylus 30 which hangs below the valve housing and arm 14 and, which constitutes a control handle that can be grasped by the operator. By means of this stylus or handle, control signals are fed into the tracer valve itself. The purpose of the system as a whole is to achieve some result by a body carried in adjacency with the tracer valve.

Because the most convenient and useful form of servo valve for use in this invention is like the conventional tracer valve, terminology consistent with these valves is used herein, it being understood that the valves in a tracer valve are properly characterized as "four way valves," and its stylus as a handle. Of course, in this device the stylus does not follow a template. Instead it is directly controlled by the operator.

An example of an application of this device is shown schematically in FIGS. 1 and 2. It is a sandslinger 35 used in foundry operations to lay down sequential layers of sand. The system starts with a hopper 36 which feeds sand to an articulated conveyor belt 37 disposed beneath and carried by and beneath the two arms. As can best be seen in FIG. 2, this conveyor belt ends beneath the arm near the tracer valve, where the belt makes a return loop 38 and the sand is dropped into a funnel 39 for distribution by a slinger such as a revolving disc 40 which discharges sand with considerable velocity out a nozzle 41. However, this example is given only as a single illustration of uses for this control, and is not a limitation. The system has as its object moving a body such as the nozzle to a desired position without the interposition of a mental process.

The tracer valve is of standard construction, whose details need not be exhaustively treated here. Persons wishing a more complete description of this tracer valve will find it in Roy Rosebrook Patent No. 2,753,145 issued July 3, 1956. The portions of the valve which are important to this invention comprise a housing 45 which is mounted to the second arm, this housing including a socket 46 which holds a ball-like member 47 that is integral with the stylus. This ball-like member permits the stylus 30 to be tilted in all directions relative to the horizontal. The stylus extends on the other side of ball-like member 47 to a joint 48 which is shown in FIG. 2 as being a wire 49 connected directly to the stylus and to a spool 50, but will preferably be a "Scotch yoke" such as shown in the foregoing Rosebrook patent.

Normal to FIG. 2 there will be a second similar wire (not shown) connected to a second spool.

Spool 50 forms a part of a first axis valve 52, and spool 51 forms a part of a second axis valve 53. Both valves are alike, except that they operate on different ones of the motors so that only valve 52 will be shown. Valve 52 includes a sleeve 54 having an internal cylindrical spool passage 55.

Spool 50 has a cylindrical outer surface which makes a fluid sliding seal therewith. Motor supply grooves 56, 57 are formed in the wall of passage 55 while a pressure groove 58 and exhaust grooves 59, 60 are formed in the outer wall of the spool. It will be noted that these grooves are formed in staggered arrays so that when the spool is centered in the sleeve as shown in FIG. 2, there is no net flow among the grooves. Motor supply grooves 66, 67 are connected to conduits 61, 62 which in turn are connected to opposite sides of second motor 22 so as to control the same.

A power source 63 draws hydraulic fluid from reservoir 64 and feeds it under pressure through conduit 65 to the inside of the sleeve so that it enters the pressure groove. Conduit 66 branches to pass through the sleeve so as to connect with both exhaust grooves 59 and 60.

In accordance with the operation shown in the aforesaid Rosebrook patent it will be seen when stylus 30 is tilted to the left then spool 50 will move to the right. Then pressure from conduit 65 will pass through pressure groove 58 to motor supply groove 57 through conduit 62 to move the piston in the second motor upward to the left in FIG. 1, exhaust fluid from the cylinder passing through conduit 61 to motor supply groove 56, thence to exhaust groove 59, and thence through conduit 66 back to reservoir. This means that as long as the man is moving along holding the stylus and tilting it in the said direction by moving his arm or body to do this, then motor 22 will extend the rod and cause pivoting of the second arm relative to the first arm such as to cause the tracer valve to pass power to the respective motors so as to move the tracer valve body in the direction in which the man has moved. Assuming that the man's hand holding the tip of the stylus is in a desired location, then he will hold the end of the stylus at that position and the body of the valve will continue to move until the relationship between the stylus and the valve is that of the null condition at which time the device will have been positioned and motion will stop. Thus, when the tracer valve "catches up" with the man then the stylus will have returned to the vertical position shown in FIG. 2 and power to the motor will be cut off by the tracer valve. Should the stylus have been tilted to the right in FIG. 2 then the connections of conduits 61 and 62 would have been reversed, and so would the motion of the second motor. Were the stylus to have been moved toward and away from the viewer of FIG. 2, similar results would have been obtained with the second axis valve 53 and its motions would have been effective on first motor 16 to move first arm 12.

Similarly, movements of the stylus between those on the respective axes will have a proportional effect upon the two valves, and cause simultaneous proportional motion of both motors. It will now be seen that a person need merely tilt the stylus to move great weights or masses around with little or no effort, and with the operator in near adjacency to that which he is handling thereby to avoid the mental correlation and skill required by remote control operations. Both the operator and the body become associated free bodies in space.

While hydraulic piston-cylinder motors have been shown as a common and most convenient means for supplying force, still it will be noted that the type of motor is not restrictive upon the invention, because their function is simply to rotate the arms relative to one another and to the reference structure.

Similarly it will be noted that by utilizing tracer valves of the type shown in Rosebrook Patent 2,835,466 issued May 20, 1958, which is a three-dimension tracer valve, it is possible to apply power to the first pivot or elsewhere in the structure so as to raise and lower the body under control of a third axis valve in the tracer valve.

The pivots are shown vertical, but the unit will operate with them horizontally, if that is the class of positioning desired. The pivots are parallel, and are parallel to the stylus in its neutral position shown in FIG. 2. In the preferred embodiment, the effective portion of the body is in alignment with the spindle axis at this time, and this alignment is parallel to the pivots.

In order to give the operator a "feel," and to assure that the valve returns to null and stops motion of the arms when the operator releases the stylus, there may be and preferably is, provided a centering means 70. This means comprises an upward extension 71 of the stylus, having an axial, conical recess 72 therein. A plunger 73 is axially aligned with the stylus when the stylus is in its central (null) position.

Plunger 73 slidably fits in a bore 74 in the valve body, and is biased downwardly by a spring 75 in the bore. The plunger has a conical recess 76 in its end that faces the stylus. A ball 77 fits in the two conical recesses, so that when the stylus is tilted, it ends to raise the plunger and compress the spring. The compressed spring tends to return the stylus to the null position. The spring has a high rate, so that the operator has a good "feel" of resistance when he tilts the stylus off null.

The foregoing is one simple example of centering means for the stylus. Others can readily be conceived, such as the spring-loading of the spools in the valves themselves so that these springs are compressed when the stylus is tilted off center. However, the arrangement shown is quite advantageous, in that there is a significant amplification of the tilt so that the plunger can move farther than the spool for a given angle of tilt.

A rate ring 78 surrounds the stylus. It limits the maximum tilt of the stylus.

This invention is not to be limited by the embodiments shown in the drawings and described in the description which are given by way of example and not of limitation but only in accordance with the scope of the appended claims.

I claim:

1. A control for positioning a body comprising: a first and a second arm, and a first and a second pivot, the first arm being jointed to the first pivot, and the second arm being jointed to the first arm by the second pivot at a location spaced from the first pivot; a first motor mounted to turn the first arm around the first pivot, and the second pivot mounted to turn the second arm around the second pivot, the arms having a position normal to each other; a tracer valve having a housing, a first and a second axis of control, a first and a second axis valve respectively to control motion along those axes, and a stylus universally mounted to said housing effective to adjust said valves in accordance with stylus tilting, the housing being mounted to the second arm at a location spaced from the second pivot; and power means connected through the first and second valves to the second and first motors, respectively, for powering the movement of the motors and thereby rotating the arms relative to each other, whereby a body carried by the second arm adjacent to the tracer valve moves in a path geometrically similar to that travelled by the tracer valve so as substantially to duplicate the path of the tracer valve.

2. A control according to claim 1 in which the motors comprise piston-cylinder combinations.

3. A control according to claim 1 in which resilient centering means biases the stylus to a position in which the tracer valve is closed to fluid flow.

4. A control according to claim 3 in which said centering means includes a plunger aligned with the stylus, a recess in the stylus and an opposed recess in the plunger, and a single ball seated in both recesses, tilting the stylus moving the plunger away from the stylus by force exerted on the ball, and a spring biasing said plunger toward the stylus to compress the ball between them.

5. A control according to claim 4 in which the recesses include a conical wall against which the ball bears.

6. In combination: a body whose position in space is to be controlled; and a control comprising: a first and a second arm, and a first and a second pivot, the first arm being jointed to the first pivot, and the second arm being jointed to the first arm by the second pivot at a location spaced from the first pivot; a first motor mounted to turn the first arm around the first pivot, and the second pivot mounted to turn the second arm around the second pivot, the arms having a position normal to each other; a tracer valve having a housing, a first and a second axis of control, a first and a second axis valve respectively to control motion along those axes, and a stylus universally mounted to said housing effective to adjust said valves in accordance with stylus tilting the housing being mounted to the second arm at a location spaced from the second pivot; and power means connected through the first and second valves to the second and first motors, respectively, for powering the movement of the motors and thereby rotating the arms relative to each other, the body being mounted to the second arm adjacent to the tracer valve so as substantially duplicate the path of the tracer valve.

7. A combination according to claim 6 in which the motors comprise piston-cylinder combinations.

8. A combination according to claim 6 in which resilient centering means biases the stylus to a position in which the tracer valve is closed to fluid flow.

9. A combination according to claim 8 in which said centering means includes a plunger aligned with the stylus, a recess in the stylus and an opposed recess in the plunger, and a single ball seated in both recesses, tilting the stylus moving the plunger away from the stylus by force exerted on the ball, and a spring biasing said plunger toward the stylus to compress the ball between them.

10. A combination according to claim 9 in which the recesses include a conical wall against which the ball bears.

References Cited
UNITED STATES PATENTS

| | | | |
|---|---|---|---|
| 2,782,802 | 2/1957 | Sassen | 91—413 |
| 2,986,006 | 5/1961 | Cox | 91—413 |
| 3,027,120 | 3/1962 | Campbell et al. | 91—378 |

MARTIN P. SCHWADRON, *Primary Examiner.*

PAUL E. MASLOUSKY, *Examiner.*

UNITED STATES PATENT OFFICE

CERTIFICATE OF CORRECTION

Patent No. 3,327,591                                June 27, 1967

Paul J. Weaver

It is hereby certified that error appears in the above numbered patent requiring correction and that the said Letters Patent should read as corrected below.

Column 1, line 26, for "foundaries" read -- foundries --; line 54, for "tractor" read -- tracer --.

Signed and sealed this 30th day of July 1968.

(SEAL)
Attest:

Edward M. Fletcher, Jr.                              EDWARD J. BRENNER

Attesting Officer                                       Commissioner of Patents